UNITED STATES PATENT OFFICE.

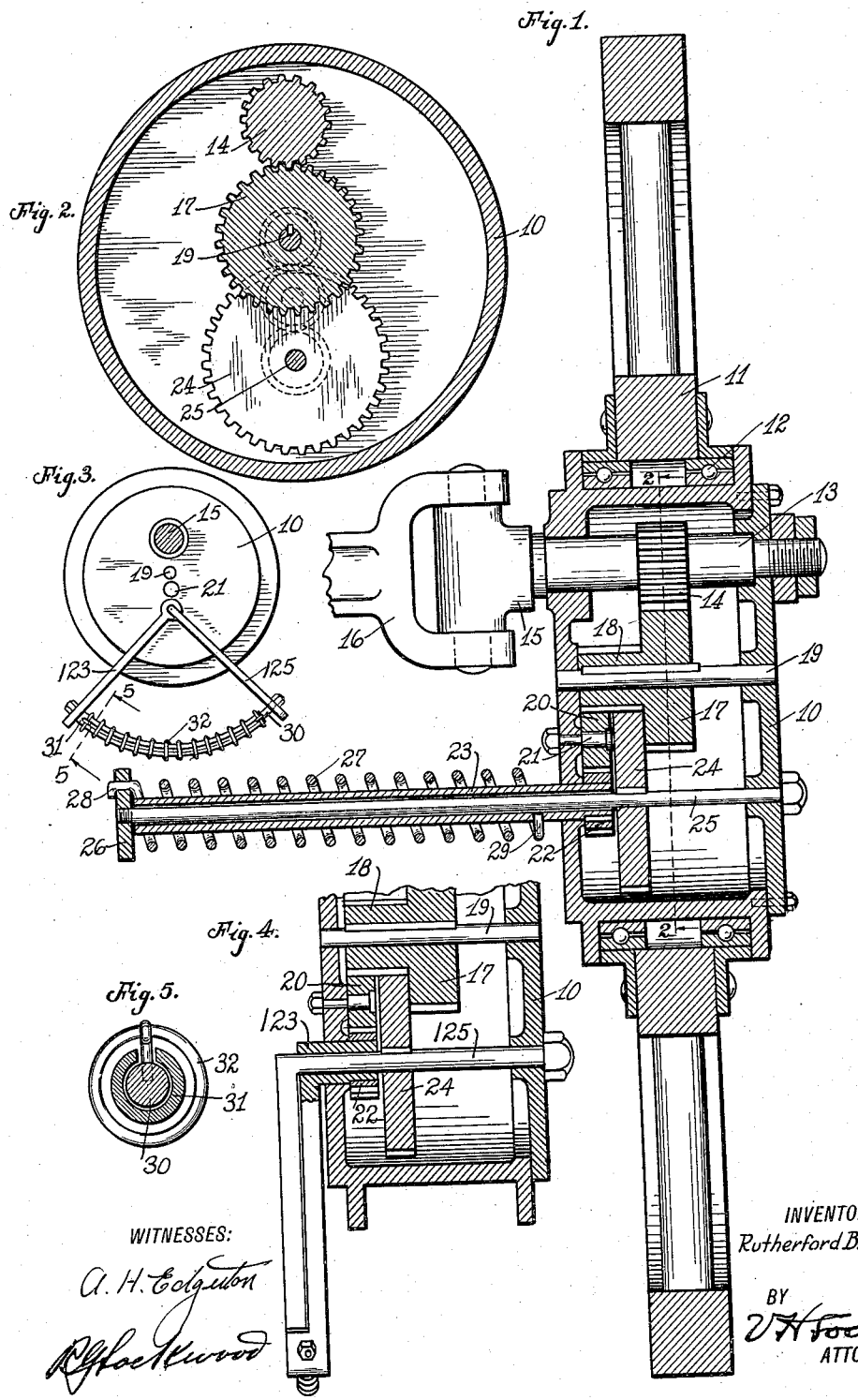

RUTHERFORD B. LONGENECKER, OF DAYTON, OHIO.

RESILIENT HUB.

1,152,956.  Specification of Letters Patent.  Patented Sept. 7, 1915.

Application filed July 27, 1914. Serial No. 353,528.

*To all whom it may concern:*

Be it known that I, RUTHERFORD B. LONGENECKER, a citizen of the United States, and a resident of Dayton, county of Montgomery, and State of Ohio, have invented a certain new and useful Resilient Hub; and I do hereby declare that the following is a full, clear, and exact description thereof, reference being had to the accompanying drawings, in which like letters refer to like parts.

The object of this invention is to provide a resilient hub or shock absorber to take the place of the pneumatic tire for taking up shocks.

The hub is composed of a large casing about which the wheel races on ball bearings and having an eccentric spindle attached freely to the hub upon which the weight of the machine or car rests. This spindle has a gear meshing with a set of gears held inside the housing of the hub which in turn mesh with two other gears, one attached to a casing and the other attached to a rod passing through the casing and a spiral spring is passed around the casing, one end attached thereto and the other end secured to the end of the rod. Thus the thrust of a shock on the wheel will turn the primary gear slightly which will turn the entire set of gears, the gear attached to the casing in one direction and the gear attached to the rod in the opposite direction, thereby winding up the spring and taking up the shock.

The full nature of the invention will be understood from the accompanying drawings and the following description and claims.

In the drawings, Figure 1 is a vertical cross section through the center of a hub. Fig. 2 is a cross section taken longitudinally of the hub on the line 2—2 of Fig. 1. Fig. 3 is a modified form of the device. Fig. 4 is a longitudinal cross section through the lower half of the modified form of the hub. Fig. 5 is a cross section on the line 5—5 of Fig. 3.

There is a hub casing or housing 10 about which the wheel 11 races on ball bearings 12. Eccentrically disposed in said housing 10 so as to oscillate therein, there is a spindle 13 with a gear 14 made integral thereon. There is a steering knuckle 15 resting on the spindle 13 and to which the front axle 16 of the car is attached. Meshing with the gear 14 there is a gear 17 with a reduced portion 18 keyed to a shaft 19 which revolves in the housing 10. Meshing with the reduced portion 18 of the gear 17 there is a gear 20 revolving on an axis 21 secured to the housing 10. Meshing with the gear 20 there is a gear 22 which is keyed to a casing 23 which oscillates in the housing 10 and extends at right angles thereto inwardly toward the body of the automobile to meet and be supported by a like construction extending from the opposite wheel, not shown. There is another gear 24 meshing with the reduced portion 18 of the gear 17 which is keyed to a shaft 25 which oscillates in the housing 10 and extends longitudinally through the entire length of the casing 23 so as to oscillate therein and is attached rigidly to a nut 26. There is a spiral spring 27, one end of which is attached to the flange 26 at 28, and the other end of which is rigidly attached to the casing 23 at 29. When the wheel strikes a bump, the thrust of the shock will at once oscillate the gear 17, since the gear 14 is rigidly attached to the spindle about which the hub oscillates. This oscillation of the gear 17 with relation to the spindle sets in motion the gears meshing therewith and increases the oscillation by means of said gears until the movement is transmitted to the gears 22 and 24 which oscillate in opposite directions by means of the idler or gear 20 and oscillate in turn the casing 23 and the rod 25 respectively in opposite directions which winds up the spring 27 and absorbs the shock.

A modified form of this device is shown in Figs. 3, 4 and 5. Instead of the casing 23 and rod 25 extending longitudinally at right angles to the housing, two rods 123 and 125 are bent down at right angles and turned away from each other at substantially right angles, as shown in Fig. 3. Joining the rods 123 and 125 at their ends are two arc-shaped rods 30 and 31 telescoping within each other. A spiral spring 32 surrounds said rods, one end of which is attached to the end of the rod 30 and the other to the end of the rod 31. By this means the arc is permitted to yieldingly contract, and the spring 32 absorbs any shock which is produced by the wheel going over a bump, through the medium of the gears 22 and 24.

The invention claimed is:

1. A wheel hub, an eccentrically disposed spindle therein, a spring member, and a set of gears connected to said spindle for actuating said spring member.

2. A wheel hub, an eccentrically disposed spindle therein, a spring member, and a gear attached to said spindle adapted to mesh with a set of gears for actuating said spring member.

3. A wheel hub, an eccentrically disposed spindle therein, gears connected to said spindle, a spring member, and means for connecting one end of said spring member to a gear revolving in one direction and the other end of said spring member to a gear revolving in the opposite direction.

4. A wheel hub, an eccentrically disposed spindle therein, two rods one within the other and attached to two gears respectively, oscillating in opposite directions and meshing with a set of gears in connection with said spindle, the outer portions of said rods turned at right angles and away from each other, and a spring attachment between the ends of said rods.

5. A wheel hub, an eccentrically disposed spindle therein, two rods one within the other and attached to two gears respectively, oscillating in opposite directions and meshing with a set of gears in connection with said spindle, the outer portions of said rods turned at right angles and away from each other, two arc shaped members telescoped between the ends of said rods, and a spiral spring surrounding said arc shaped members with each end attached respectively to each arc shaped member.

In witness whereof, I have hereunto affixed my signature in the presence of the witnesses herein named.

RUTHERFORD B. LONGENECKER.

Witnesses:
JESSE CUMINGS,
CARL W. HOSKET.

Copies of this patent may be obtained for five cents each, by addressing the "Commissioner of Patents, Washington, D. C."